Nov. 11, 1941.   P. A. J. L. VISSCHERS   2,262,594
CONTROL OF ELECTRICAL APPARATUS, PARTICULARLY TELEVISION RECEIVERS
Filed April 12, 1940
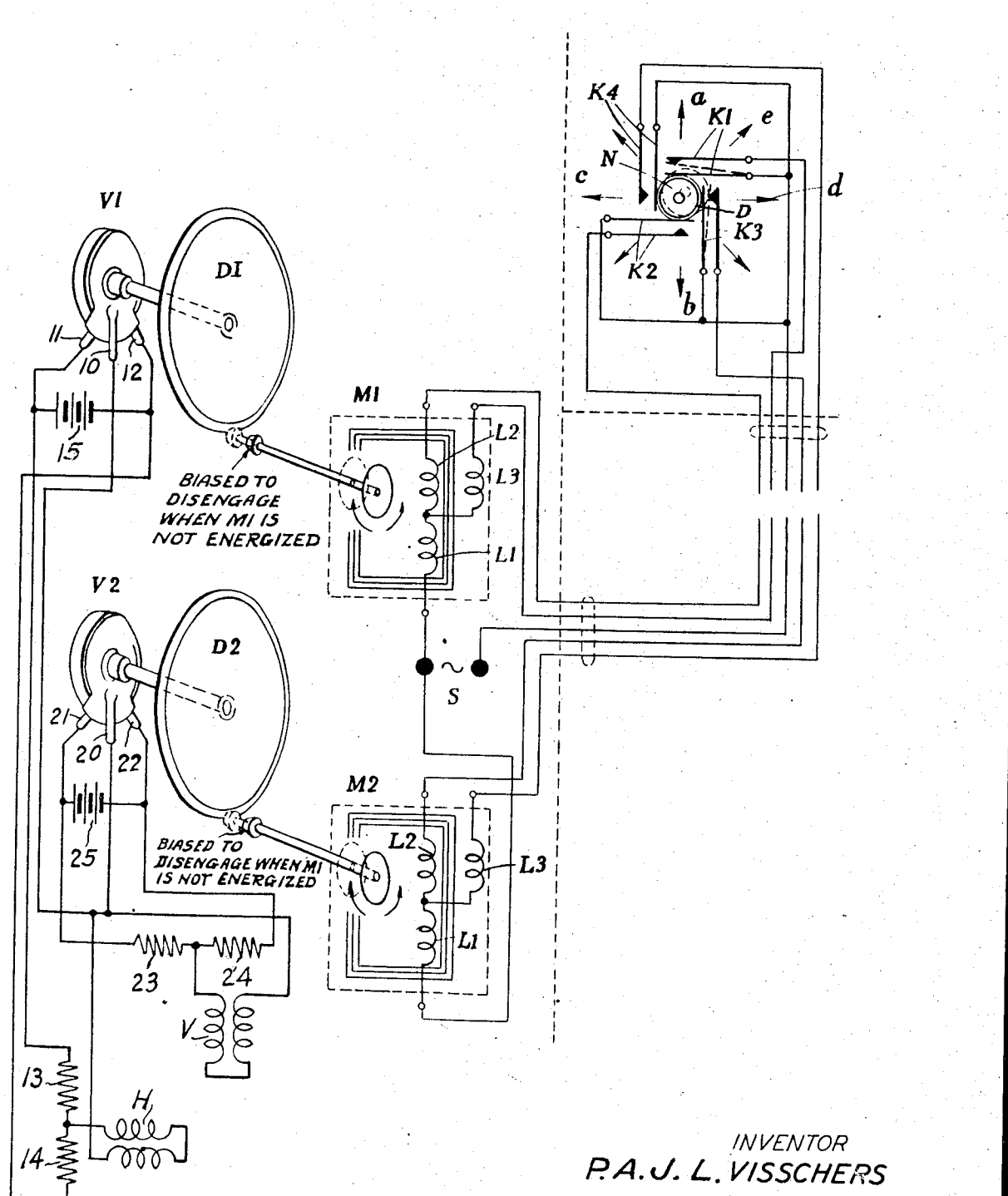
INVENTOR
P. A. J. L. VISSCHERS
BY *Ch. Sprague*
ATTORNEY Patented Nov. 11, 1941

2,262,594

UNITED STATES PATENT OFFICE 2,262,594

CONTROL OF ELECTRICAL APPARATUS, PARTICULARLY TELEVISION RECEIVERS

Pierre August Joseph Leopold Visschers, Antwerp, Belgium, assignor to Western Electric Company, Incorporated, New York, N. Y., a corporation of New York Application April 12, 1940, Serial No. 329,225
In Great Britain April 25, 1939

5 Claims. (Cl. 178—69.5)

This invention relates to the remote control of electrical apparatus, especially television receivers, and is concerned with the control of two reversible operations performed by motors or relays.

It is an object of this invention to provide novel remote control means for electrical apparatus and particularly for television cathode ray tubes.

According to the invention two reversing switches at the control point are operated respectively by movement of a single control member in two mutually inclined directions whereby each motor or relay at the controlled station may be selectively energised or de-energised for forward or reverse movement independently of the other.

The control unit may comprise a lever pivoted for limited angular movement in all directions with resilient contacts disposed around the lever and interconnected to form two reversing switches independently controlled by the lever. The lever may in addition be rotatable about its axis to control an auxiliary operation.

The invention is applicable in a variety of systems. It may for example be used in a radio receiver for the control both of a tuning motor and another motor or relay performing another function such as wave band selection. It is, however, especially suitable for the remote control of de-centering in a television receiver where provision is made for centering on the screen any portion of the received picture and for magnifying the centered portion to obtain a close-up view. A television receiver having such features is described in the British Patent 520,235, while mechanical joystick controls especially suitable for centering control in such television receivers are described in British Patent 520,234. In certain of its aspects the control unit of the present invention may be regarded as a joystick control with an electrical rather than a mechanical link with the controlled apparatus whereby remote control is greatly facilitated.

The preferred form of the invention will now be described with reference to the accompanying drawing.

In the drawing V1 and V2 are two potentiometers representative of any two rotatable elements, the angular positions of which are required to be adjusted independently from a remote point. These potentiometers are coupled to driving discs D1, D2 adapted to be driven by reversible electric motors M1, M2 of the eddy-current disc or shaded-pole type. When either motor is energised, its disc rotor R is pulled axially into the field of the windings and this axial movement is used to bring the frictional gear S into engagement with the disc D1 or D2. The disc rotor is then rotated and drives the potentiometer in a direction determined by the manner of excitation of the motor. Upon de-energisation of the motor, the disc rotor being suitably biased is released and the coupling to the driving disc D1 or D2 is broken. This is highly desirable as it facilitates direct manual operation of the potentiometer independent of the remote control.

Each motor is energised from an alternating current source S, usually the domestic mains supply, windings L1, L2 being excited for rotation in one direction ("forward" rotation) and windings L1, L3 for rotation in the other direction ("reverse" rotation) in well-known manner. The reversing switch for motor M1 consists of contacts K1, K2 and that for motor M2 consists of contacts K3, K4 arranged and connected as shown about a lever N. This lever is supported at one end by a flexible coupling such as a length of rubber tubing or by some other kind of coupling such as a ball-and-socket joint which allows the lever to be moved in any direction out of its normal axial position. A suitable construction of the lever and its associated contacts is illustrated in British Patent 519,905.

It will be seen that movement of the lever N in direction $a$ drives motor M1 alone in one direction, movement in direction $b$ reverses motor M1, while movement in directions $c$ and $d$ controls the motor M2 in a similar manner. Movement of the lever in other directions has the effect that both motors are energised, for example movement in direction $e$ results in the reverse rotation of M1 and the forward rotation of M2. There are actually nine effective positions for the lever N including its central rest position and by suitable movement any desired rotation of one or both motors can be achieved. Release of the lever or its return to central position results in the stopping of the motors in their adjusted positions.

In the preferred construction a small disc D is fitted on the lever engaging all the movable contacts when the lever is central. The resiliency of these contacts then ensures the return of the lever to its central position when it is released.

Various modifications will be readily apparent. For example contacts K1, K2 may be combined into a single group of springs on one side only of the lever, the central spring being respectively pushed against the outer contact and pulled against the inner contact by movements of the lever in directions a and b. Contacts K3, K4 can be modified in the same way. It may even be desirable in some cases to arrange that the lever deflection not only completes the circuit but varies the resistance therein to vary the motor speed according to the amount of deflection. It will be obvious also that other kinds of reversible motor can be used as well as reversible relays. Clearly also the lever may be axially rotatable to control some other function.

When the arrangement described is utilised for control of centering in television receivers, potentiometers VI and V2 or their equivalents are connected to control respectively the centering in different directions at right angles. In a typical arrangement, the potentiometers or equivalent rheostats are connected to vary the bias voltages or currents applied to the horizontal and vertical deflecting systems of a television cathode ray tube. As shown in the drawing, the pair of auxiliary deflector coils marked V are responsible for deflection of the spot on the screen in one direction and those marked H for deflection in a direction at right angles to the first direction. The coils H and V are connected in bridge circuits as shown and carry no current when the rotary contact elements 10 and 20 of the potentiometer resistances VI and V2, respectively, are in center position between the terminals 11 and 12 and 21 and 22 of the resistances VI and V2, respectively. Displacement of the position of the rotary element 10 from a center position causes an unbalance in the bridge network including the resistances 13, 14, potentiometer VI, source of potential 15, and the coils H. Current thus flows through the coils H to cause a displacement in one direction. Similarly, displacement of the rotary contact element 20 from a center position causes an unbalance in the bridge network comprising the coils V, the resistance elements 23, 24, potentiometer V2, and the source of potential 25 causing a current to flow in the coils V to produce a deflection in a direction substantially at right angles to the first direction. It can readily be arranged that the picture moves relatively to the screen in the same way that the lever is moved relatively to the area of possible movement so that no difficulty arises in knowing in which direction to move the lever. If, for example, the head of a soloist appears in the upper left-hand corner of the complete television picture, a close-up view can be gained by moving the lever downwardly to the right, holding it there until the head reaches the center of the screen and by rotating the lever or other magnification control to cause the picture to overflow the screen.

What is claimed is:

1. In a television system employing a cathode ray tube, means for providing a bias for the horizontal and vertical deflecting means of said cathode ray tube, two variable resistance elements being included in said bias means, two reversible motors each connected to vary one of said variable resistances in both directions from a neutral point, a reversing switch for each of said motors, and means comprising a common manual control lever for operating said switches independently.

2. In a television system employing a cathode ray tube, means for providing a bias for the horizontal and vertical deflecting means of said cathode ray tube, two variable resistance elements being included in said bias means, two reversible motors each connected to vary one of said variable resistances in both directions from a neutral point, a reversing switch for each of said motors, and means comprising a common manual control lever for selectively operating said switches independently or together.

3. In a television system employing a cathode ray tube, means for providing a bias for the horizontal and vertical deflecting means of said cathode ray tube, two variable resistance elements being included in said bias means, two reversible motors each connected to vary one of said variable resistances in both directions from a neutral point, and means comprising a common manual control lever and a plurality of reversing switches for selectively operating each of said motors for forward or reverse movement independently of the other.

4. A system for the remote control of two reversible operations involved in the de-centering of a television image on the screen of a cathode ray receiver comprising horizontal and vertical deflecting systems of said receiver, two resistor elements for applying respectively variable bias to said deflecting systems, reversible motors located at the controlled point and which are coupled respectively to vary the resistance of said resistor elements, reversing switches for said motors, said switches being located at the viewing point, a common manual control lever for said switches, said control lever being mounted so as to be moved in two mutually inclined directions whereby each motor can be selectively energized or de-energized for forward or reverse movement independently of the other.

5. The combination with the elements of claim 4 of a driving means between each of said motors and its corresponding resistor element which driving means is biased so as to break its operable connection when said motor is not energized.

PIERRE AUGUST JOSEPH
  LEOPOLD VISSCHERS.